United States Patent
Chen

(10) Patent No.: US 6,442,556 B1
(45) Date of Patent: Aug. 27, 2002

(54) DECOMPRESSION SOFTWARE PACKAGE THAT CAN STORE FILES IN ASSIGNED STORAGE DEVICE

(75) Inventor: Song-Bor Chen, Taipei (TW)

(73) Assignee: Inventec Corp., Taipei (TW)

( * ) Notice: Subject to any disclaimer, the term of this patent is extended or adjusted under 35 U.S.C. 154(b) by 0 days.

(21) Appl. No.: 09/455,739

(22) Filed: Dec. 4, 1999

(51) Int. Cl.[7] .......................... G06F 7/00; G06F 17/30; G06F 17/00
(52) U.S. Cl. .......................... 707/101; 707/104; 707/10
(58) Field of Search ................. 707/100–104; 345/418–501; 341/51–55; 369/84–112; 386/30, 101–111; 710/1–10; 600/443; 713/1–2; 709/203–206, 219; 711/170–173

(56) References Cited

U.S. PATENT DOCUMENTS 5,959,944 A * 9/1999 Dockes et al. ................. 369/84
6,016,402 A * 1/2000 Thomas et al. ................. 710/8
6,170,055 B1 * 1/2001 Meyer et al. ................... 713/2
6,231,510 B1 * 5/2001 Negrin et al. ............... 600/443

* cited by examiner

*Primary Examiner*—Safet Metjahic
*Assistant Examiner*—Susan Chen
(74) *Attorney, Agent, or Firm*—W. Wayne Liauh

(57) ABSTRACT

This specification discloses a decompression software package that can store files in an assigned storage device, which is mainly used to restore the previously partitioned/compressed files such as drivers, application programs or utilities downloaded from the network to a user assigned path or storage device. By directly running a decompression program, such as a quick release sector transfer (QRST) utilities, the user can select for the file to be restored a path of the storage device, such as a 1.44 MB floppy disk drive, an LS-120 or zip drive, or a hard drive. While restoring/decompressing the file, the software data such as the name of the software, version, etc, can be recorded to the aforementioned path, and a directory name can be built automatically at the same.

5 Claims, 2 Drawing Sheets

DECOMPRESSION SOFTWARE PACKAGE THAT CAN STORE FILES IN ASSIGNED STORAGE DEVICE

BACKGROUND OF THE INVENTION

1. Field of the Invention

This invention relates to a decompression software package that can store files in an assigned storage device.

2. Related Art

As a conventional decompression program, the quick release sector transfer (QRST) has the function of reverting compressed drivers or application utilities into 1.44 MB floppy disks. Since most application programs that the user wants to download from the network are composed of several files and occupy a large memory space, they have to be partitioned into several blocks that are not greater than 1.44 MB in advance and the files contained in the blocks are compressed to form compressed files. These compressed files stored on the network server would not occupy too much memory. After downloading desired software, the user can run QRST to restore the software and run the installation program therein to use this software. However, since the design of QRST can only decompress software onto 1.44 MB floppy disks while current application programs are getting bigger and bigger in size, if a program occupies tens of Mega Bytes six or more floppy disks are needed during the restoration process. This does not only waste time but also causes inconvenience.

SUMMARY OF THE INVENTION

In view of the foregoing, one object of the present invention is to provide a decompression software package that can store files in an assigned storage device, which can store the restored/decompressed file of the compressed software downloaded from the network to a user assigned path.

The decompression software package that can store files in an assigned storage device provided by the present invention comprises one or a plurality of compressed files, a decompression program, and a means for assigning a storage path; wherein the compressed file contains partitioned/compressed software, the decompression program restores the file and generates the plurality of files of the software, and the means for assigning a storage path provides the selection of storing the software files to a storage device while running the decompression program.

The storage devices for selection include the floppy disk, the hard drive, the CD-ROM, and even the LS-120 or zip drive disk, depending upon the path choice by the user. Other than that, the means for assigning a storage path also provides the selection of entering the storage device path and setting up the directory and subdirectory names of the files in the software. It also judges whether the storage device of the user selected path has enough memory space for storage. If there is not enough space, an error message will be displayed and the user is asked to enter a new path.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

The following example explains the decompression model of QRST utilities.

Taking an application program that contains tens of files as an example, suppose its size is 10 MB. Before compression, the memory space occupied by the software is too big and inconvenient for direct access or transmission. If the usual compression software such as WinZip or RAR is employed to compress it, certain compression ratio could be obtained. This ratio is determined by both the type of the file to be compressed and the method of compression. For instance, taking the ratio 0.6 for calculation, the compression method of either WinZip or RAR is first to compress the 10 MB software into a 6 MB file and then to partition it into 5 blocks that are not greater than 1.44 MB. So five compressed files are formed and can be stored in five 1.44 MB floppy disks. QRST utilities discussed in this specification are not like that. The compression method this software uses is first to partition the 10 MB into eight blocks that are not greater than 1.44 MB and then to compress each of the eight blocks into eight compressed files. Although the number of files generated by QRST is greater than that generated by WinZip or RAR, yet it is ensured that when these eight compressed files are decompressed by QRST each of them could be stored in a 1.44 MB floppy disk. This allows the user to use 1.44 MB floppy disks to install utilities. This concept of allowing the compressed file to be restored by QRST into a 1.44 MB floppy disk was put into the design of QRST. Nevertheless, this design is also the main reason why QRST is inconvenient. Since most of the software for downloading, such as drivers or application utilities, is large in size, therefore, using QRST to decompress and restore the software requires continuously changing floppy disks during the process, which is extremely inconvenient.

To resolve the above problem, the present invention provides an enhanced QRST, which is a software program running on a computer. The main function is restoring/decompressing software and the information such as its name and version after the user assigns the disk drive device and path for the software to be restored to.

The aforementioned disk drive device can not only be the usual floppy disk drive, but can be storage devices such as LS-120, the zip drive, the hard drive or CD-ROM. The software of the instant invention can perform different processes on decompressed software according to the type of and the available space on the disk. For example, it can automatically set up directory names such as Disk1, Disk2, etc, or display messages such as "Please replace with another disk," "Insufficient memory on the disk," etc.

Figure 1:
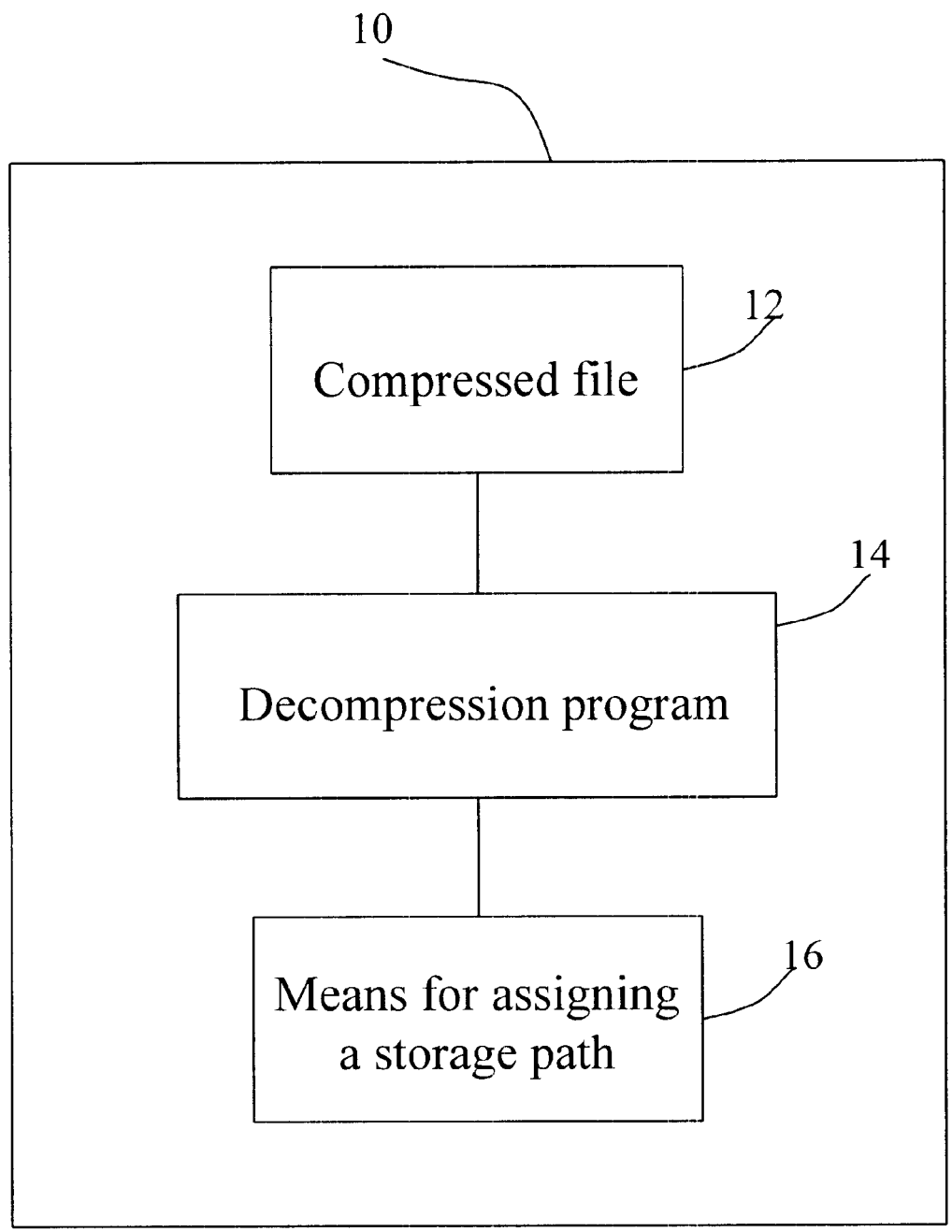
FIG. 1 is a schematic view of a decompression software package that can store files in an assigned storage device according to the instant invention.

The present invention provides a decompression software package 10 that can achieve the goal of storing files in an assigned storage device. Referring to FIG. 1, the package comprises a single or a plurality of compressed files 12, which is a file formed by partitioning/compressing a software; a decompression program 14, which can restore/decompress the compressed files 12 into the original software; and a means 16 for assigning a storage path, which allows the user to select a storage device to store the software while the decompression program is running. On one hand, the notifying messages, such as the name and version of the software to be restored and decompressed and where the restored file belongs to, can be displayed while the decompression program is running. On the other hand, after the user assigns the path of the storage device, such as the floppy disk drive A: or the hard drive C:, it would be first determined whether there is enough space for storing this software. If there is, the invention then sets up directories and subdirectories on this storage path and performs decompression. The message "Please replace with another disk." Would show up while decompressing the files to notify the user that one compressed file has been decompressed. If it is determined that there is not enough space on the storage path, the message "Insufficient memory on the disk." Is also displayed to inform the user that a new disk drive and path should be entered.

Figure 2:
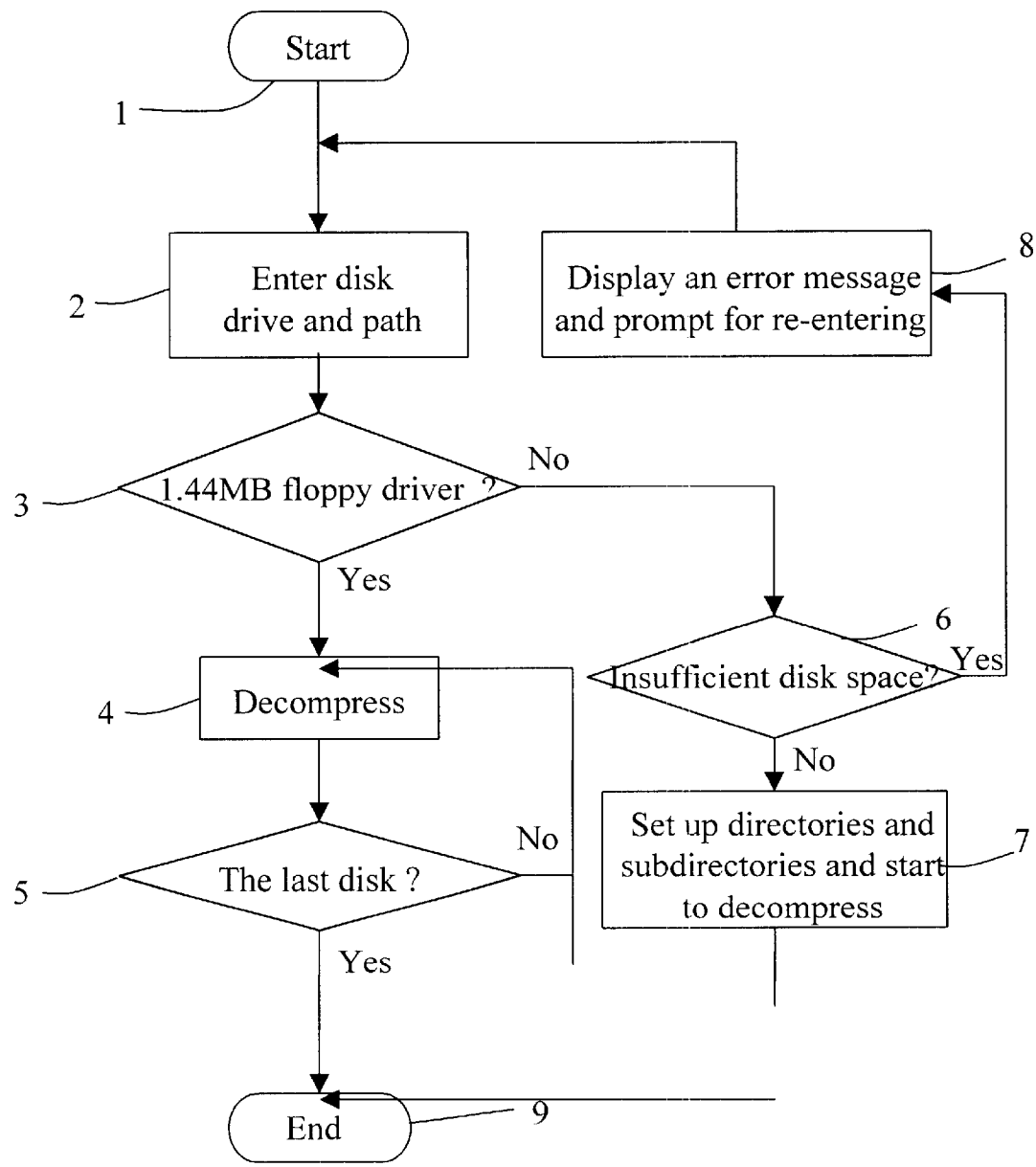
FIG. 2 is a flow chart of the decompression procedure according to the instant invention.

A concrete implementation procedure is further explained by the flow chart in FIG. 2.

As shown in FIG. 2, when QRST is used to decompress a compressed file (step 1), information such as the name, version, and abstract of the software is displayed according to the data in the compressed file for the user's reference and confirmation. Then another message is displayed to ask the user to enter the path of the disk drive (step 2). The user can select the path for storage by browsing. A: or C: can be entered directly to represent the storage device is the floppy disk drive or the hard drive. Or a directory path is entered to explicitly assign the place for storage. Then it is determined whether the entered path is a 1.44 MB floppy disk drive (step 3). If the answer is yes, that means the user chooses to decompress the file into a floppy disk (step 4); otherwise, it is further determined whether the disk space is not enough on the selected storage device (step 6). After step 4, it is also determined if the program of the instant invention is performing the last disk (step 5). If the answer is no, then the procedure returns to step 4 for further decompression; otherwise, the software restoration/decompression procedure has been completed and the whole decompression flow finishes (step 9). After step 6, that means the user chooses a non-floppy disk as the device for storing the decompressed file. Through the determination in step 6, if the disk space on the selected path is enough then the set up of directories and subdirectories and decompression are performed (step 7) until all compressed files have been decompressed and restored to the software needed, then the whole procedure finishes (step 9). Otherwise, the procedure jumps to step 8 and displays an error message to inform the user that a new disk drive or path should be entered. Then the procedure returns step 2 and repeats all previous steps for the newly entered disk drive and path until the whole procedure finishes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A decompression software package for storing files in an assigned storage device, which package comprises:

a compressed file, which contains partitioned/compressed software, a decompression module for decompressing the partitioned/compressed software into a plurality of files; and a means for assigning a storage path, which allows the storage of the files into an assigned storage device or path;

wherein the decompression module contains quick release sector transfer (QRST) utilities, and the compressed file has a size smaller than 1.44 MB.

2. The decompression software package for storing files into an assigned storage device as set forth in claim 1, wherein the software is a driver.

3. The decompression software package for storing files into an assigned storage device as set forth in claim 1, wherein the software is a utility program.

4. The decompression software package for storing files into an assigned storage device as set forth in claim 1, wherein the means for assigning a storage path further comprises the provision of entering the selection of the storage device path and of setting up directories and subdirectories for the files in the software.

5. The decompression software package for storing files into an assigned storage device as set forth in claim 1, wherein the software is an application program.

* * * * *